M. CULMORE.
INNER TUBE FOR PNEUMATIC TIRES.
APPLICATION FILED JUNE 26, 1908.

919,135.

Patented Apr. 20, 1909.

WITNESSES:

INVENTOR
March Culmore
BY
ATTORNEY

UNITED STATES PATENT OFFICE.

MARCH CULMORE, OF HOUSTON, TEXAS.

INNER TUBE FOR PNEUMATIC TIRES.

No. 919,135.

Specification of Letters Patent.

Patented April 20, 1909.

Application filed June 26, 1908. Serial No. 440,437.

*To all whom it may concern:*

Be it known that I, MARCH CULMORE, citizen of the United States, residing at Houston, in the county of Harris and State of Texas, have invented certain new and useful Improvements in Inner Tubes for Pneumatic Tires, of which the following is a specification.

My invention relates to new and useful improvements in inner tubes for pneumatic tires.

The object of the invention is to provide a tube having layers of fabric vulcanized in a portion thereof and extending loosely beyond a portion of the tube, which portion is reinforced so as to expand against the fabric; and in providing such a tube to produce one which will not burst or explode when the casing is accidentally displaced from the rim.

Another feature is to provide a tube of such strength and resiliency as to readily fit in an old casing which has been stretched without detrimental effects.

Finally the object of the invention is to provide a device of the character described that will be strong, durable and efficient, and simple and comparatively inexpensive to produce; also one which will not be liable to get out of working order.

Figure 1:
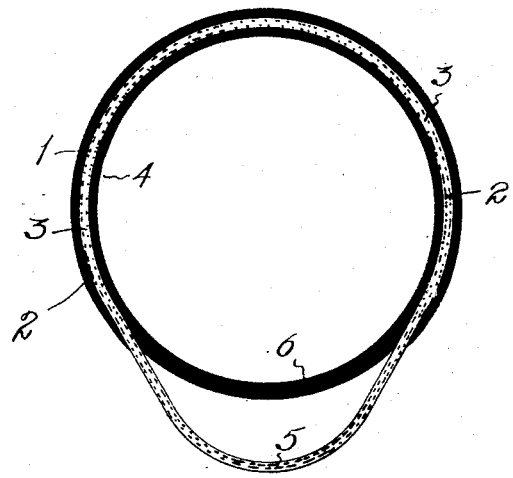
Figure 2:
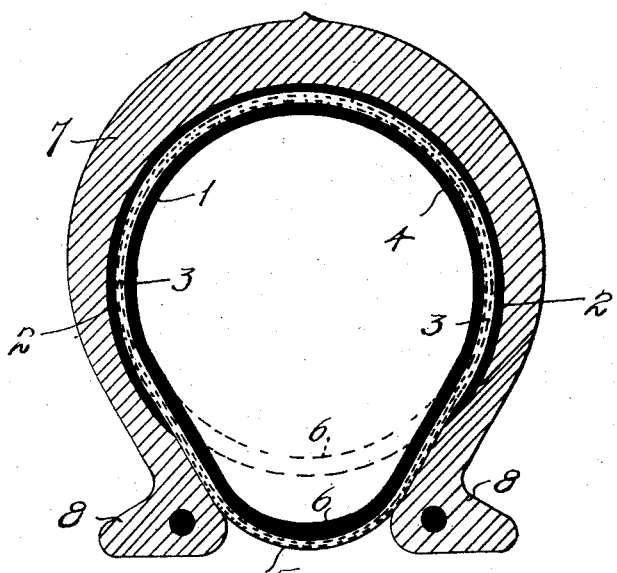

With the above and other objects in view, the invention has relation to certain novel features of construction and operation, an example of which is described in the specification and illustrated in the accompanying drawings, wherein:

Figure 1 is a cross section of my improved tube uninflated, and Fig. 2 is a cross section of a tire showing my tube in position therein and inflated, its uninflated position being indicated in dotted lines.

In the drawings the numeral 1 designates the tube which is formed with an outer coating or layer of rubber 2 extending partially therearound. This layer is vulcanized to a plurality of layers of fabric 3, to the inner side of which a circular layer of rubber 4 is vulcanized throughout a portion of its circumference. The fabric layers extend some distance beyond the rubber layers 2 and 4 forming a pocket 5. The inner layer 4 swings across this pocket some distance inward as indicated at 6. The portion 6 of the layer 4 is considerably thicker than the rest of the layer and of such resiliency as to be capable of expansion into the pocket.

In Fig. 2 the tube is shown in a casing 7, the layer 2 contacting with the tread and side portions of the casing. It will be noted that the pocket 5 fits between the shoes 8 of the casing and in close proximity or on the rim (not shown). Inward from the layer 2, the fabric layers contact with the inner walls of the casing, that is, when the tube is inflated. It will be noted that when the tube is inflated substantially all the expansion takes place at the portion 6 which is forced into the pocket 5 and into contact with the fabric layers, which latter protect and support the said portion. It will be further noted that the fabric layers extend continuously around the tube rendering it extremely strong and durable and capable of resisting severe shocks and impacts. As a matter of fact the pocket 5 forms a guard to limit the expansion of the portion 6 and at the same time so stoutly supports the inner layer 4 as to prevent bursting of the same. In this way should the outer casing be displaced from the rim by accident, the tube would not explode or burst on account of its protecting layers of fabric and resilient nature. It is evident that if the portion 6 was not expanded to such an extent as to closely contact with the inner walls of the fabric pocket, the latter would still protect the said portion and give it additional space into which to expand as will be apparent.

What I claim, is:

1. A tube for pneumatic tires comprising a layer of rubber, and a fabric portion partially secured to the layer and having a portion free from the layer to form a continuous pocket into which the layer of rubber is adapted to expand.

2. A tube for pneumatic tires comprising a layer of rubber, and a fabric portion partially secured to the layer, said fabric portion having a portion extending beyond the layer of rubber and across which the said layer extends.

3. A tube for pneumatic tires comprising a layer of rubber, and a fabric portion partially secured to the layer and having a portion extending beyond the layer of rubber and across which the said layer extends, that portion of the layer of rubber extending across the extended portion of the fabric being considerably thicker than the remainder of the layer of rubber.

4. A tube for pneumatic tires comprising a continuous inner layer of rubber, and a fabric portion partially secured to the layer and having a portion extending away from the layer and forming a pocket into which the layer is adapted to expand.

5. A tube for pneumatic tires comprising a layer of rubber, and a continuous layer of fabric secured to the layer of rubber throughout a portion of its contour, said layer of fabric having a portion unattached and extending away from the layer of rubber.

6. A tube for pneumatic tires comprising a continuous layer of fabric, and a continuous layer of rubber considerably smaller in diameter than the layer of fabric, said layer of fabric having a portion vulcanized to the layer of rubber and a portion unattached to and extending away from the layer of rubber.

7. A tube for pneumatic tires comprising an inner layer of rubber, a plurality of layers of fabric surrounding said inner layer and having a portion forming a pocket into which the inner layer is adapted to expand, and an outer layer of rubber partially covering the fabric layer.

In testimony whereof I have signed my name to this specification in the presence of two subscribing witnesses.

MARCH CULMORE.

Witnesses:
  WM. A. CATHEY,
  EVA CATHEY.